United States Patent [19]
Dolengowski

[11] Patent Number: 4,970,046
[45] Date of Patent: Nov. 13, 1990

[54] MARINE SEISMIC SOURCE FRAME

[75] Inventor: George A. Dolengowski, Bellaire, Tex.

[73] Assignee: Exxon Production Research Company, Houston, Tex.

[21] Appl. No.: 261,875

[22] Filed: Oct. 24, 1988

[51] Int. Cl.⁵ .............................................. H04R 23/00
[52] U.S. Cl. .................................... 367/153; 367/144; 367/173; 181/110; 181/120
[58] Field of Search ............... 367/144, 153, 142, 173; 181/120, 110, 118

[56] References Cited

U.S. PATENT DOCUMENTS

| | | | |
|---|---|---|---|
| 3,019,412 | 1/1962 | Crawford | 367/144 |
| 3,039,094 | 6/1962 | Anderson | 367/153 |
| 3,444,511 | 5/1969 | Morrow | 367/144 |
| 3,789,401 | 1/1974 | Behrendt | 367/144 |
| 3,893,539 | 7/1975 | Mott-Smith | 181/115 |
| 3,953,826 | 4/1976 | Brundrit et al. | 340/7 |
| 4,056,164 | 11/1977 | Johnston | 181/114 |
| 4,180,139 | 12/1979 | Walker | 181/120 |
| 4,323,989 | 4/1982 | Huckabee et al. | 367/153 |
| 4,353,431 | 10/1982 | Kirby | 181/118 |
| 4,635,747 | 1/1987 | Bird, Sr. et al. | 181/120 |
| 4,658,384 | 4/1987 | Dragoset, Jr. et al. | 367/23 |
| 4,658,387 | 4/1987 | Dolengowski et al. | 367/144 |
| 4,719,987 | 1/1988 | George et al. | 181/114 |
| 4,721,180 | 1/1988 | Haughland et al. | 181/111 |

FOREIGN PATENT DOCUMENTS

| | | |
|---|---|---|
| 1417995A | 12/1975 | United Kingdom . |
| 1590873A | 6/1981 | United Kingdom . |
| 2217456A | 1/1989 | United Kingdom . |

OTHER PUBLICATIONS

Magazine advertisement Appearing in "The Leading Edge", Oct., 1988, Geophysics Magazine, published by Society of Exploration Geologists.

Primary Examiner—Charles T. Jordan
Assistant Examiner—J. Woodrow Eldred
Attorney, Agent, or Firm—Raul R. Montes

[57] ABSTRACT

An apparatus for positioning a plurality of marine seismic sources in an array. The marine seismic sources are retained in retaining means which are mounted to a frame so that each source is separated from the nearest other source in the array by a predetermined distance. Shock absorbing means are mounted in the frame intermediate each of the retaining means and each other retaining means mounted to the frame.

58 Claims, 7 Drawing Sheets

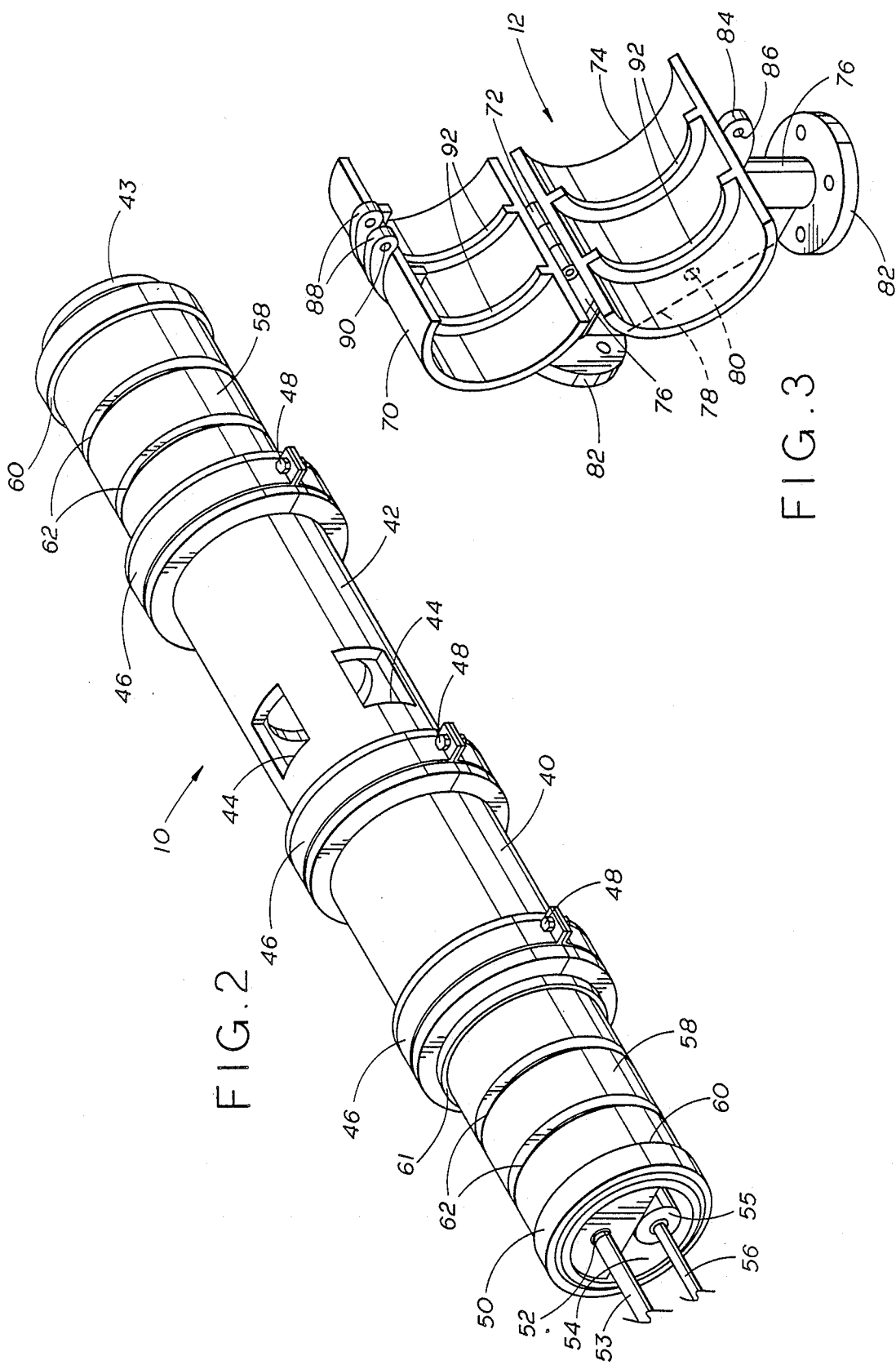

MARINE SEISMIC SOURCE FRAME

FIELD OF THE INVENTION

This invention relates generally to seismic prospecting. More particularly, it relates to a frame for mounting marine seismic sources in an array.

BACKGROUND OF THE INVENTION

In marine seismic exploration, one or more seismic sources are deployed in a body of water and fired to produce sonic pulses or shock waves which propagate through the body of water and into the subterranean geologic formations beneath the floor of the body of water. The pulses are reflected back from the subfloor geologic formations as acoustic waves. An array of geophones, hydrophones, or like equipment detects the reflected acoustic waves and converts such waves to electronic signals. These electronic signals are recorded for subsequent analysis and interpretation. Analysis of the recorded signals can provide an indication of the structure of the subfloor geological formations and attendant petroleum accumulations in those formations.

Marine seismic exploration is most commonly conducted in bodies of saltwater, however, the term "water", as used in this description and in the appended claims, is meant to include sea, lake, swamp, and marsh water, mud, and any other liquid containing sufficient water to enable operation of the marine seismic sources employed in connection with the invention.

There are a number of conventional marine seismic sources available for generating a sonic pulse in a body of water. For example, explosives such as dynamite may be used to introduce strong pulses into subfloor formations. The use of such explosive charges has declined, however, due to safety and ecological concerns. Another conventional marine seismic source utilizes the discharge of a bank of capacitors through a subsurface electrode to produce a quickly collapsing implosive gaseous bubble. Yet another conventional marine seismic source uses explosive gases (such as mixtures of propane and air or propane and oxygen) to produce a sonic pulse on ignition. Implosive sources, such as water guns, are also conventional in marine seismic exploration.

Other, more common conventional acoustic energy sources use high pressure compressed gases instead of explosive mixtures. Typical designs for open ported compressed gas guns are found in U.S. Pat. No. 3,653,460 issued Apr. 4, 1972 to Chelminski and U.S. Pat. No. 4,141,431 issued Feb. 27, 1979 to Baird. A typical compressed gas gun for marine seismic exploration includes a cylindrical housing which contains a chamber adapted to confine a charge of compressed gas at high pressure. The chamber is fitted with a valve. The valve is closed while the pressure is increased in the chamber. When the gun is "fired", the valve is rapidly opened. This allows the compressed gas to expand out of the chamber and, through exhaust ports in the housing, into the surrounding medium to create an acoustic pulse.

A particular type of compressed gas gun, the air gun, has become widely used as a marine seismic energy source. The typical air gun has the compressed gas gun configuration described above wherein the compressed high pressure gas is air. Typically, the compressed air in such guns is maintained at pressures between 2,000 and 6,000 psi prior to release into the water to create the desired acoustic pulse.

Conventional air guns typically include a cylindrical housing containing exhaust ports through which the compressed air is released when a valve is opened in the gun. The exhaust port configuration of these underwater compressed air guns may vary. In a common configuration, a plurality of exhaust ports are distributed around the periphery of the cylindrical housing of the compressed gas gun. PAR® Air Guns available from Bolt Technology Inc., Norwalk, Conn. are examples of air guns with four symmetrically distributed exhaust ports. In another configuration, compressed air is released through a single exhaust port which extends 360° about the periphery of the gun. Sleeve Guns® available from Geophysical Service, Inc., Dallas, Tex. are examples of air guns with single 360° exhaust ports. In such external sleeve air guns, a shuttle valve concentric with the gun housing slides along the outer surface of the housing to open and close the exhaust port.

Although such air guns are widely used in industry and possess significant advantages over previously employed devices, their effectiveness in seismic exploration is frequently hampered by difficulties with secondary oscillations which are associated with the acoustic impulses they generate. It is well known to those skilled in the art that the preferred form of sonic energy for use in seismic exploration has the form of a single acoustic impulse, rather than a train or series of impulses as may be produced as a result of secondary oscillations. When explosive charges were more widely used in seismic exploration, such single impulses were achieved by firing the explosive charges near the surface of the body of water so as to vent the explosion to the atmosphere and thus preclude the generation of secondary oscillations. The strength of the pulses generated by air guns, however, is not great enough to permit their firing so near the water surface. Instead, it is necessary to fire the air gun at a reasonable depth, where there is much less loss of signal strength. When an air gun is fired at such depths, however, the discharged air forms a bubble, the elasticity of which couples with the inertial mass of the surrounding water to produce an oscillating system. The air bubble will grow and shrink at its natural period until the energy is dissipated to the water and the bubble comes to equilibrium volume. The oscillations so produced are undesirable because they produce a train of secondary pressure pulses which reduce the spectral quality obtainable from within the initial primary signal component. The amplitude ratio of the primary signal component of the generated signal to the strongest of the accompanying successive oscillation components has commonly been termed the "primary to bubble ratio". As is known to those skilled in the art, the primary to bubble ratio is maximized wherever possible, in order to optimize the spectral frequency content of the air gun.

It has been learned that the primary to bubble ratio may be improved by a particular positioning of the air guns. By increasing the primary to bubble ratio, the technique produces an acoustic signal much more suitable for seismic exploration. The technique for improving the primary to bubble ratio involves an array of at least three air guns. The air guns are adapted to produce discharged air bubbles each having a substantially equal maximum radius, R. Each air gun is separated from each of the other air guns nearest thereto by a certain critical distance, D, which is selected so as to maximize the primary to bubble ratio. D should not be less than 1.2 R and should not be greater than the quantity 2R. The sources in the array, the air guns, are characterized as "interdependent" when they are separated by the critical spacing. In one embodiment, the array includes a set of four air guns positioned at the corners of a square having sides of approximate length /2R. In another embodiment, the array includes a set of three air guns positioned at the vertices of a triangle. The guns in each array are fired simultaneously as a set. Two or more such arrays may be deployed simultaneously as a multiple array.

Practice of this technique requires that the desired critical distance between the air guns in the array be maintained while the array is deployed and fired. One approach which has been used is to arrange the air guns within a rigid boxlike positioning structure by means of chains attached unyielding to the gun bodies and structure. This arrangement, however, is difficult to assemble and, once it is assembled, it is difficult to remove and install individual guns should their repair or replacement be necessary. This approach also results in a bulky, unwieldly assembly which is difficult to handle on deck and deploy from a marine seismic vessel.

It is also central to the practice of the abovedescribed technique that the air guns in the array be fired together simultaneously. When fired, each of the air guns generates severe explosive shock energy which is potentially very destructive to the positioning structure to the gun itself and its attachment points, and, if transmitted through the positioning structure, to the other guns in the array. For example, when the boxlike positioning structure described above has been used, the unyielding mounted chains have suffered severe stretching damage to their links. The resulting slackness of the chains and ineffective positioning of the air guns has been further aggravated by loss of link material due to erosion.

Still further, it will be recognized that, inasmuch as the critical distance between the air guns is determined by the radius of the discharged air bubble, and as the different sizes of air guns used in marine seismic exploration produce air bubbles having different radii, the spacing between the air guns must vary according to the size of the guns. The positioning structure described above cannot readily be adjusted to provide different spacing for different guns—a separate such structure must be fabricated and kept on hand for each size gun which may be used in the course of the seismic exploration.

Accordingly, the present invention is aimed at providing an apparatus for effectively positioning an interdependent array of air guns which is durable and has a long service life, and which reduces shock damage to the guns in the array. Furthermore, the present invention is aimed at providing a positioning apparatus which is relatively easy to assemble and in which individual air guns may be more readily removed and reinstalled. Still further, the present invention is aimed at providing such an apparatus in which the distance between the air guns can more easily be adjusted to accommodate a range of gun sizes. The present invention is also aimed at providing a positioning apparatus which is suitable for handling on and deployment and towing from a marine seismic vessel.

BRIEF DESCRIPTION OF THE DRAWINGS

FIG. 2 is a perspective view of a marine seismic source air gun assembly as mounted in the frame of the present invention.

FIG. 3 is a perspective view of a clamp assembly used to mount an air gun assembly as illustrated in FIG. 2 in the frame of the present invention.

SUMMARY OF THE INVENTION

Briefly, the present invention involves an apparatus for positioning a plurality of marine seismic sources in an array. The marine seismic sources may be air gun assemblies. A plurality of clamps are provided to retain the air gun assemblies, and are mounted to a frame so that each air gun assembly is spaced apart from the nearest other air gun assembly in the array by a predetermined distance. Shock absorbing means are mounted in the frame intermediate each of the clamps mounted thereto. The frame may comprise a plurality of pipe links, and the shock absorbing means may each comprise an elastomeric stack shock absorber.

DETAILED DESCRIPTION OF THE PREFERRED EMBODIMENT

The invention apparatus is a frame for positioning marine seismic sources. In its preferred embodiment, the invention apparatus is a frame for positioning a set of at least three air guns in an array such that each air gun is spaced apart from the nearest other gun thereto by a pre-determined distance. A set of commercially available air guns of substantially equal volume would be suitable for use in the preferred embodiment of the invention.

Figure 1:
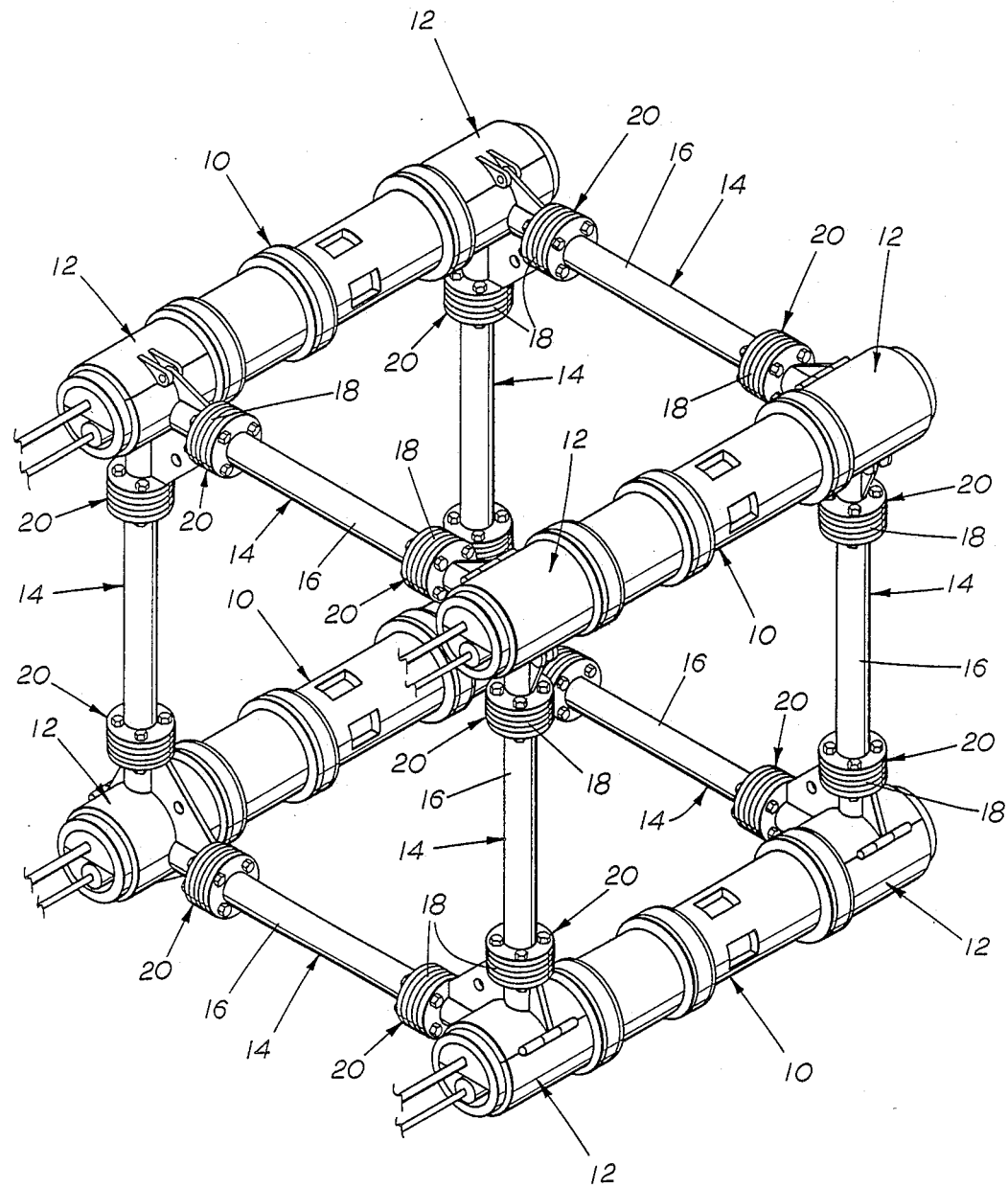
FIG. 1 is a perspective view of a marine seismic source array embodying the present invention. The array includes four air gun assemblies held at a selected spacing with respect to each other by a frame in accordance with the invention.

With reference to FIG. 1, four air gun assemblies 10, which are preferably substantially cylindrical in shape, are shown mounted in two parallel frame assemblies in accordance with the present invention. Air gun assemblies 10 will be described in greater detail below with reference to FIG. 2. In the embodiment illustrated, each air gun assembly 10 is mounted in the frame assemblies by a pair of clamp assemblies 12, one clamp assembly being clamped about each end of the air gun assembly. It will be understood, however, that in some applications it may be desirable to have each air gun assembly held by a single clamp assembly mounted on a single frame assembly, or by more than two clamp assemblies and parallel frame assemblies. Clamp assemblies 12 will be described in greater detail below with reference to FIG. 3.

Each clamp assembly 12 is bolted to a spool assembly 14, as will be described in greater detail below with reference to FIG. 4. Spool assemblies 14 provide elongate spacing members for spacing clamp assemblies 12 (and the air guns retained therein) apart from each other by a predetermined distance. Spool assemblies 14 each comprise a pipe link 16 with flanges 18 welded on each end. Spool assemblies 14 interconnect clamp assemblies 12 at a predetermined distance from each other. In the preferred embodiment illustrated, two spool assemblies 14 are connected at right angles to each of four clamp assemblies 12 to form a frame assembly having an open square pattern. Depending on the number of gun assemblies in the array, the spool assemblies can preferably be arranged in a suitable polygonal form with the clamp assemblies located at the corners and having two spool assemblies mounted thereto. A plurality of such polygonal frames, each substantially parallel to the others, may preferably be arranged along the length of the gun assemblies as desired, similar to the arrangement shown in FIG. 1. Furthermore, such substantially parallel frames may desirably be interconnected, so as to provide additional support and relieve stresses on the gun assemblies, by longitudinal pipe links running between them, and shock absorbing means may also be mounted between the frames and the longitudinal pipe links. It will be understood by those skilled in the art, however, that a wide variety of alternative arrangements may be employed. For example, each of the four clamp assemblies could be mounted to spool assemblies arranged in a cruciform pattern. Or, as another example, a plurality of parallel spool assemblies could be substituted for each individual spool assembly illustrated in the preferred embodiment. Furthermore, it would be obvious to one skilled in the art to substitute some other structural link, such as a solid bar or a flexible link, in place of the tubular pipe links illustrated in the preferred embodiment. For example, in some applications it may be found desirable to fabricate all or part of such structural links from an elastomeric material, such as rubber, in order to provide the frame with additional shock absorbing capability. Still further, it will be understood that the pipe links could be arranged in a triangular pattern in frames for mounting three air guns, or in other suitable geometric patterns for frames mounting more than four air guns.

A significant advantage of the present invention is that the spacing between the air gun assemblies can be easily and quickly adjusted as desired by installing spools (pipe links 16 with flanges 18) of appropriate length. Similarly, a variety of sizes of frames may be constructed (to accommodate a variety of sizes of air guns) from a standard parts set wherein only the lengths of the spools vary.

In the practice of the technique described above, each of the air gun assemblies 10 would preferably be capable of producing in a body of water a bubble having a maximum radius, R, and clamp assemblies 12 would preferably be mounted to spool assemblies 14 having an appropriate length so that each gun assembly in the array will be spaced apart from the nearest other gun assembly by a distance no less than 1.2 R, and will be spaced apart from the farthest other gun assembly by a distance no greater than 2R.

Mounted intermediate each clamp assembly 12 and each of the spool assemblies 14 attached thereto is a shock absorber assembly 20, which is preferably a resilient shock absorber and which will be described in greater detail below with reference to FIG. 4. As used in this description and in the appended claims, the term "resilient" refers to the capability of a described assembly, body, or material to recover its size and shape after being deformed, as, for example, by compressive stresses. It is a function of shock absorber assemblies 20 to absorb explosive shock energy generated by firing of air gun assemblies 10 and to thereby reduce damage to the frame and air guns mounted therein resulting from such shock energy.

With reference now to FIG. 2, an air gun assembly suitable for mounting in the frame of the present invention is illustrated. As mentioned above, commercially available air guns would be suitable for use in the frame. One example of such an air gun, similar to that illustrated, is the Bolt Model 1900C. The particular air gun shown has an actuating chamber 40, a main body 42, and a pressure chamber 43. Main body 42 is provided with ports 44 through which compressed air stored in pressure chamber 43 is released to form a gas bubble as described above. Actuating chamber 40, main body 42, and pressure chamber 43 are mounted together coaxially in a conventional manner by band assemblies 46 which are secured by bolts 48. Mounted on the end of actuating chamber 40 opposite main body 42 is extension 50. Extension 50 is mounted to actuating chamber 40 by a band assembly 46. Extension 50 is provided with a conduit 52 for supplying compressed air to actuating chamber 40 and which is adapted to receive the end of a compressed air supply line 53 which extends from the deploying vessel (not shown). Extension 50 is also provided with a passageway 54 which is adapted to accommodate the extension thereinto of a solenoid valve 55 which is mounted on the end of actuating chamber 40, and to permit the passage therethrough of electrical control lines 56 which activate the solenoid valve.

Extension 50 and pressure chamber 43 are preferably each provided with external cylindrical rubber sleeves 58. Shoulders 60 and 61 are provided on the outer ends of housing 50 and pressure chamber 43 to prevent rubber sleeves 58 from sliding off the assembly. As will be described in more detail below, rubber sleeves 58 help absorb shocks when the gun assembly is mounted in the frame. As used in this description and in the appended claims, the term "rubber" is intended to include all suitable elastomeric or resilient materials having appropriate shock absorbing characteristics. Rubber sleeves 58 are preferably provided with circumferential grooves 62 which react with corresponding internal ribs on clamp assemblies 12 to securely hold the gun assembly in the frame. Extension 50 and pressure chamber 43 thus provide suitable mounting portions or surfaces for clamp assemblies 12 to grasp in order to mount air gun assembly 10 in the frame of the present invention.

It should be noted at this point that certain models of air guns, such as Pnu-Con ® guns available from Geophysical Service, Inc., Dallas, Texas are themselves provided with circumferential end flanges which provide suitable mounting portions for clamp assemblies to grasp. When using such guns, clamp assemblies and molded rubber sleeves corresponding to the shape of such end flanges may preferably be used.

Referring now to FIG. 3, a preferred embodiment of a clamp assembly for mounting an air gun assembly in the frame of the present invention will be described. Clamp assembly 12 comprises generally a semi-cylindrical pivotable portion 70 which pivots about a hinge 72 relative to a semi-cylindrical fixed portion 74. Pivotable portion 70 and fixed portion 74 each have inner diameters selected to correspond to the external diameters of rubber sleeves 58 (see FIG. 2).

Each fixed portion 74 is welded to two pipe extensions or segments 76 which extend radially from the fixed portion at a right angle to each other. It will be understood that the angle between the pipe segments will vary if more or fewer gun assemblies are to be mounted in the frame. Gusset plates 78 are preferably welded in place between fixed portion 74 and pipe segments 76 to provide additional strength and rigidity. Those gussett plates which are welded interior to the angle formed between the two pipe segments 76 converge to form a web which is penetrated by an eye 80. Eye 80 provides a convenient attachment point for handling or deploying the array, and for attachment of flotation buoys. Additional eyes may be provided as needed for towing the array. A flange 82 is welded to each pipe segment 76 which extends from fixed portion 74. Each flange 82 is in turn mounted to a shock absorber assembly 20 and a flange 18 on a spool assembly 14, the other end of which is mounted to another shock absorber assembly 20 and another clamp assembly 12 (see FIG. 1). Flanges 18 and 82 thus provide mounting means for attaching the clamp and spool assemblies, intermediate which can be mounted shock absorbing means.

Fixed portion 74 also has mounted on it, opposite hinge 72, an ear 84 having a transverse hole 86 therethrough. When pivotable portion 70 is rotated so as to close clamp assembly 12 around the housing 50 or pressure chamber 43 (as shown in FIG. 2) of an air gun assembly, corresponding ears 88 mounted on pivotable portion 70 overlap with ear 84. A bolt (not shown) may then be passed through hole 86 in ear 84 and corresponding holes 90 in corresponding ears 88 to securely lock clamp assembly 12 in the closed position. Additional sets of such ears may be provided if additional strength is desired.

This pivoting clamp arrangement permits quick and easy removal and installation of air gun assemblies 10: when it is necessary to remove and reinstall an air gun, as for repair or replacement, clamp assemblies 12 are simply opened, the gun assembly is removed or replaced, and the clamp assemblies are closed about the gun assembly again.

Fixed portion 74 and pivotable portion 70 are also each provided with circumferential ribs 92 about their inner surfaces Ribs 92 are adapted to mate with and engage grooves 62 in rubber sleeves 58 (see FIG. 2) when clamp assembly 12 is closed around the air gun assembly, thereby restricting longitudinal motion of the air gun assembly relative to the frame.

As described above with reference to FIG. 1, each flange 82 on a clamp assembly 12 is mounted to a shock absorber assembly 20 and a spool assembly 14, which in turn is mounted to another shock absorber assembly 20 and clamp assembly 12. Hence the shock absorber assemblies are mounted "in-line" between each of the air gun assemblies held in the frame. The "in-line" shock absorber assemblies help ensure long frame and air gun life by dampening the repeated shocks from explosive gun energy which would otherwise be destructive to the frame and the air gun assemblies. The shock absorber assemblies are designed to absorb undesirable vibration in both the push and pull and the bending directions. Although the preferred embodiment of the present invention illustrated in FIG. 1 employs two "in-line" shock absorber assemblies mounted in series between each of the air gun assemblies in order provide particularly effective dampening of explosive gun energy, it would be obvious to one skilled in the art to reduce or increase the number of shock absorber assemblies as desired. Additional shock absorbtion protection between the air gun assemblies and the frame is also provided by rubber sleeves 58 (see FIG. 2).

Figure 4:
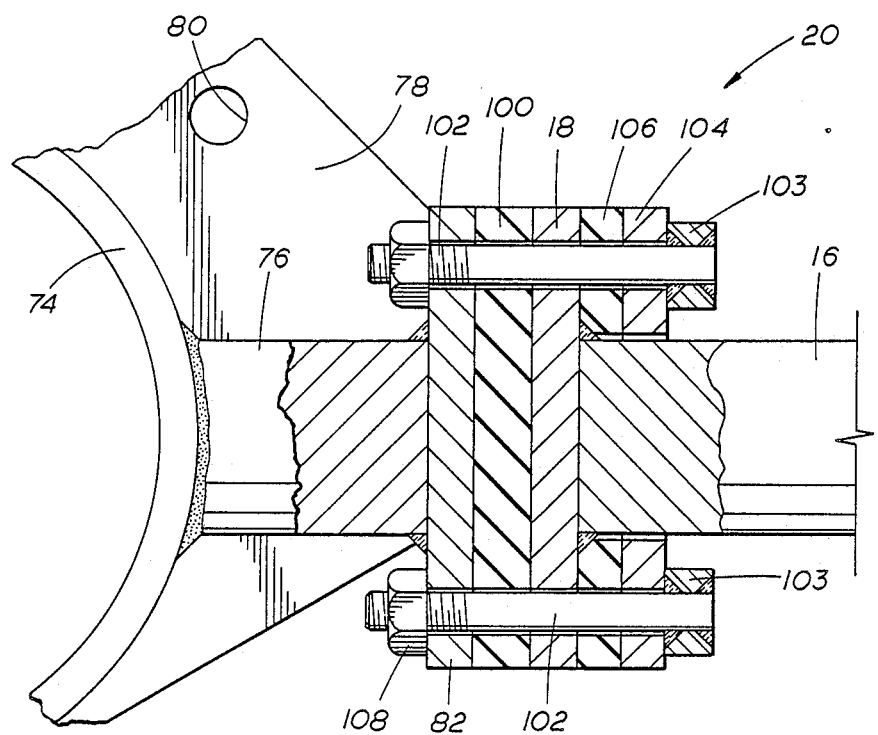
FIG. 4 is a sectional view of a shock absorber assembly as used in the frame of the present invention and shown in FIG. 1.

With reference now to FIG. 4, a preferred embodiment of shock absorber assembly, as used in the frame shown in FIGURE 1, will be described. The stack shock absorber illustrated in FIG. 4 is particularly suited to use with air gun assemblies which incorporate relatively small air guns. With reference to FIG. 4, it will be seen that a elastomeric disc 100 is positioned intermediate flanges 82 and 18. Elastomeric disc may be constructed of rubber or any other resilient material having suitable shock absorbing characteristics. Flanges 82 and 18 are held together, with elastomeric disc 100 positioned between them, by bolts 102. Bolts 102 have heads 103 on one end which abut steel compression ring plate 104, which is positioned coaxially about pipe link 16. Bolts 102 pass through, in series, (1) compression ring 104, (2) toroidal (doughnut-shaped) elastomeric bushing 106, which is positioned intermediate compression ring plate 104 and flange 18, (3) flange 18, (4) elastomeric disc 100, and (5) flange 82. Nuts 108 are threaded onto bolts 102 on the side of flange 82 which is opposite ring plate 104. Elastomeric disc 100 thus serves to absorb undesirable shock vibrations in the push direction between the flanges, while elastomeric bushing 106 serves to absorb shock vibrations in the pull direction. Since it is also desirable for stack shock absorber 20 to be able to absorb bending motion between the spool and clamp assemblies, it is preferable that adquate clearance be provided about bolts 102, and between pipe link 16 and compression ring 104 and elastomeric bushing 106, as shown in FIG. 4, in order to accommodate such bending motion.

Figure 5A:
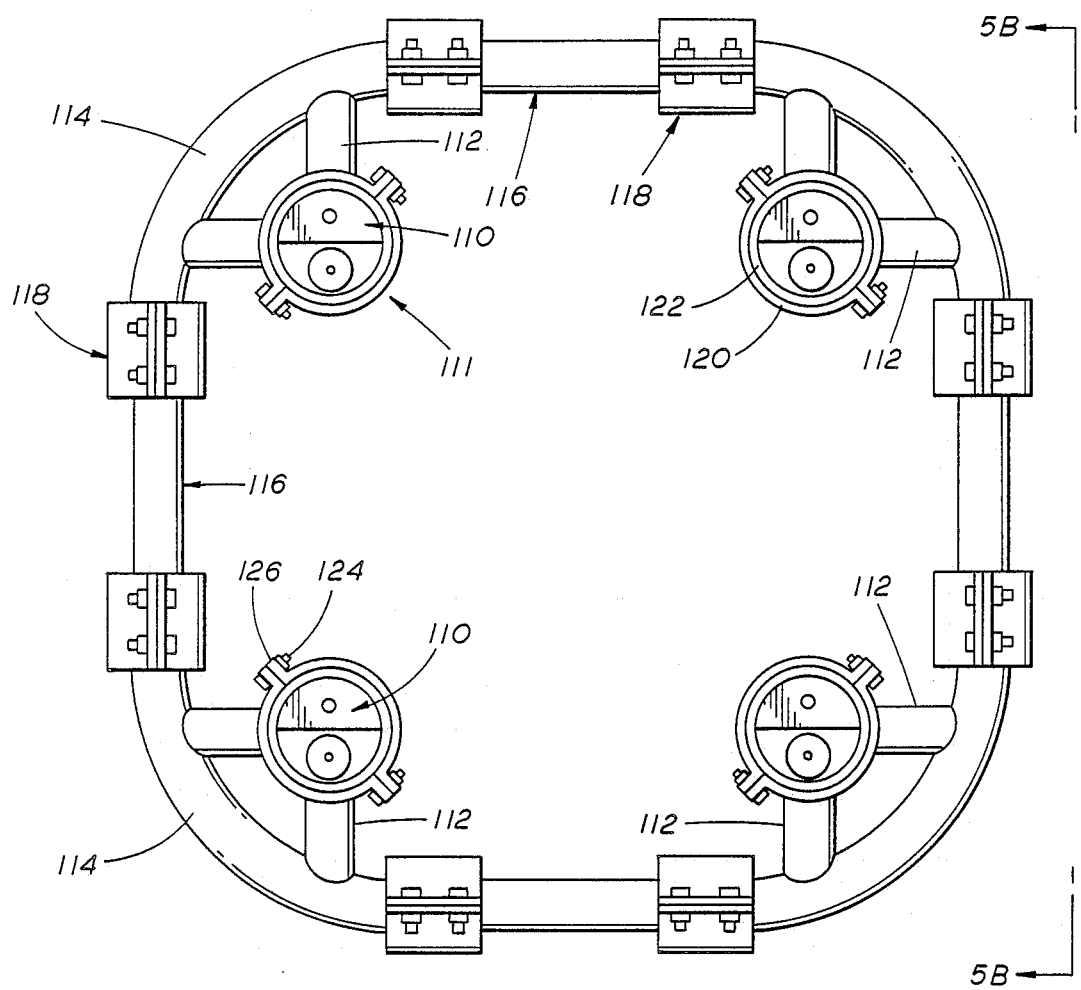
FIG. 5A is a plan end view of another embodiment of a marine seismic source array embodying the present invention. The array includes four air gun assemblies held at a selected spacing with respect to each other by a frame in accordance with the invention.

With reference now to FIG. 5A, another embodiment of the frame of the present invention will be described. FIG. 5A illustrates an embodiment of which is particularly advantageous for providing additional protection for the air gun assemblies mounted therein during handling and deployment of the array. Referring to FIG. 5A, it can be seen that air gun assemblies 110, such as those previously described, are held fixedly in clamp assemblies 111. Each clamp assembly 111 is mounted by a pair of pipe segments 112 to an arcuate corner pipe link 114. Each arcuate corner pipe link describes or forms a predetermined angle. Corner pipe link 114 in the particular embodiment illustrated in FIG. 5A, which is adapted to mount four air gun assemblies 110, forms an arc through approximately 90°, and clamp assembly 111 is mounted interior to the arc. Each arcuate corner pipe link 114 is mounted to a spool assembly 116, and that spool assembly 116 to another corner pipe link having another clamp assembly 111 thereon, with a shock absorber assembly 118 mounted intermediate each corner pipe link 114 and spool assembly 116 as will be described in more detail below with respect to FIG. 6. Corner pipe links 114 and spool assemblies 116 are connected so as to form a square pattern (as viewed from the end) with air gun assemblies 110 held interior to the square pattern, and with each air gun assembly separated from the nearest other air gun assemblies thereto by the desired critical distance. As discussed, this separation distance can be adjusted for different sizes of air guns by selecting suitable lengths for spool assemblies 116.

With still further reference to FIG. 5A, it will be observed that clamp assembly 111 illustrated therein represents an alternative embodiment of clamp assembly as compared to that illustrated in FIG. 3. Clamp assembly 111 comprises a semicylindrical detachable portion 120 and a semi-cylindrical fixed portion 122 which is mounted to curvate pipe line 114 by means of pipe segments 112 in the manner previously described. Rather than pivoting with respect to each other, detachable portion 120 and fixed portion 122 are secured to each other when clamped about an end of a gun assembly 110 by means of bolts 124 which pass through matching ears 126. Detachable portion 120 and fixed portion 122 are each preferably provided with interior ribs which engage grooves in rubber sleeves on gun assemblies 110, as previously described with reference to FIG. 3.

Figure 5B:
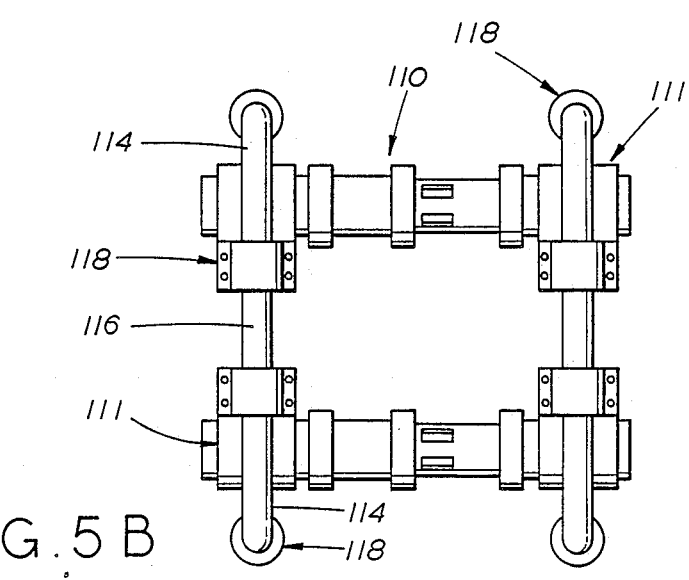
FIG. 5B is a plan side view of the array shown in FIGS. 5A.

With reference now to FIG. 5B, a side view of the array shown in FIG. 5 can be seen. In a manner similar to that described with respect to FIG. 1, each air gun assembly 110 in FIG. 5B is held in two clamp assemblies 111, which are in turn mounted on two parallel frame assemblies. This arrangement provides support at both ends of the gun assembly, which enhances gun assembly life, and which also reduces gun assembly motion relative to each of the frame assemblies, and thus reduces the stress on the frame assemblies. It will be obvious to those skilled in the art, however, that air gun assemblies 110 could be mounted in only one frame assembly, or, alternatively, in three or more parallel frame assemblies arranged along their length, as may be desired.

Figure 6:
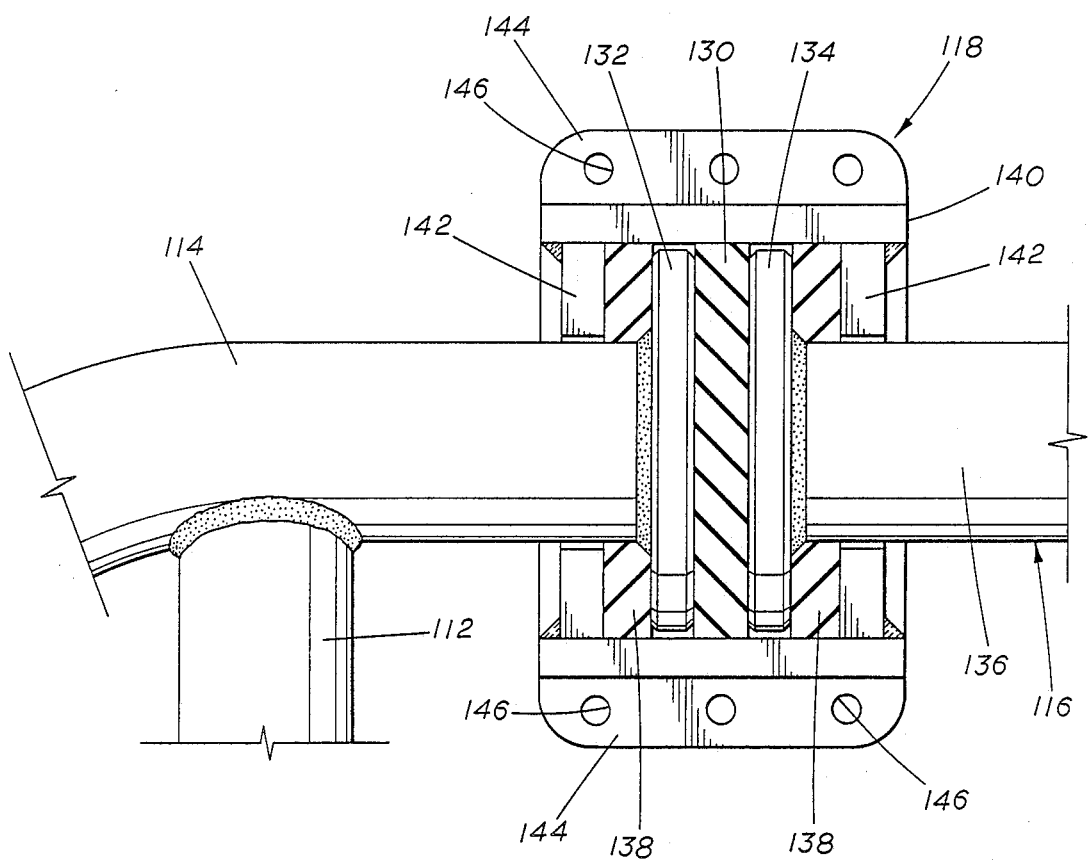
FIG. 6 is a sectional view of another embodiment of a shock absorber assembly as used in the frame of the present invention shown in FIGS. 5A and 5B.

With reference now to FIG. 6, another embodiment of stack shock absorber, as used in the frame shown in FIGS. 5A and 5B will be described. The stack shock absorber shown in FIG. 6 is particularly suited to use with air gun assemblies using large or small air guns. With reference to FIG. 6, it will be seen that an elastomeric disc 130 is positioned intermediate flanges 132 and 134. Flange 132 is mounted, preferably by welding, to corner pipe link 114, as previously described, and flange 134 is mounted, also preferably by welding, to pipe link 136 and forms part of spool assembly 116. Elastomeric disc 130 has diameter approximately corresponding to that of flanges 132 and 134. Toroidal elastomeric bushings 138, which also have an external diameter approximately corresponding to that of flanges 132 and 134, are positioned on the sides of flanges 132 and 134 which are opposite elastomeric disc 130. Elastomeric bushings 138 are fitted around corner pipe link 114 and pipe link 136 and may be of either two-piece construction or split one-piece construction in order to facilitate their installation.

Flanges 132 and 134, elastomeric disc 130, and elastomeric bushings 138 are all held together by a pair of semicylindrical shock covers 140. For purposes of clarity, only one shock cover 140 is shown in FIG. 6. Each semicylindrical shock cover 140 is provided with semicircular compression end plates 142 welded thereto. Shock covers 140 have an internal diameter which conforms generally to the external diameters of flanges 132 and 134, elastomeric disc 130, and elastomeric bushings 138, while semicircular end plates 142 have internal diameters which conform generally to the external diameters of pipe link 136 and corner pipe link 114. As was described above with reference to FIG. 4, it is desirable that the stack shock absorber be able to absorb bending forces encountered in operation of the array. Accordingly, adequate clearance is preferably provided between (1) the inner diameters of shock covers 140 and the external diameters of flanges 132 and 134, and (2) the internal diameters of end plates 142 and the external diameters of pipe link 136 and corner pipe link 114, as is shown in FIG. 6, in order to accommodate such bending motion. Each shock cover 140 is also provided with ears 144 which extend radially outward proximate the longitudinal edges of the shell. When a pair of semicylindrical shock covers 140 are positioned about flanges 132 and 134, elastomeric disc 130, and elastomeric bushings 138, their longitudinal edges meet so that ears 144 are in approximate alignment with each other. Bolts (not shown) can then be passed through matching holes 146 in the ears 144 to secure the entire stack shock absorber assembly together. When the stack shock absorber is thus assembled, rubber disc 130 is positioned intermediate flanges 132 and 134, and rubber bushings 138 are positioned on the sides of the flanges opposite rubber disc 130 and intermediate the flanges and end plates 142. Rubber disc 132 hence serves to absorb undesirable shock vibrations in the push direction between flanges 132 and 134, while rubber bushings 138 serve to absorb undesirable shock vibrations in the pull direction between the flanges.

It will be obvious to those skilled in the art that alternative forms of shock absorbers may be substituted for the stack shock absorbers described above in the apparatus of the present invention. For example, a hydraulic or metal spring shock absorber could be used if desired.

Figure 7:
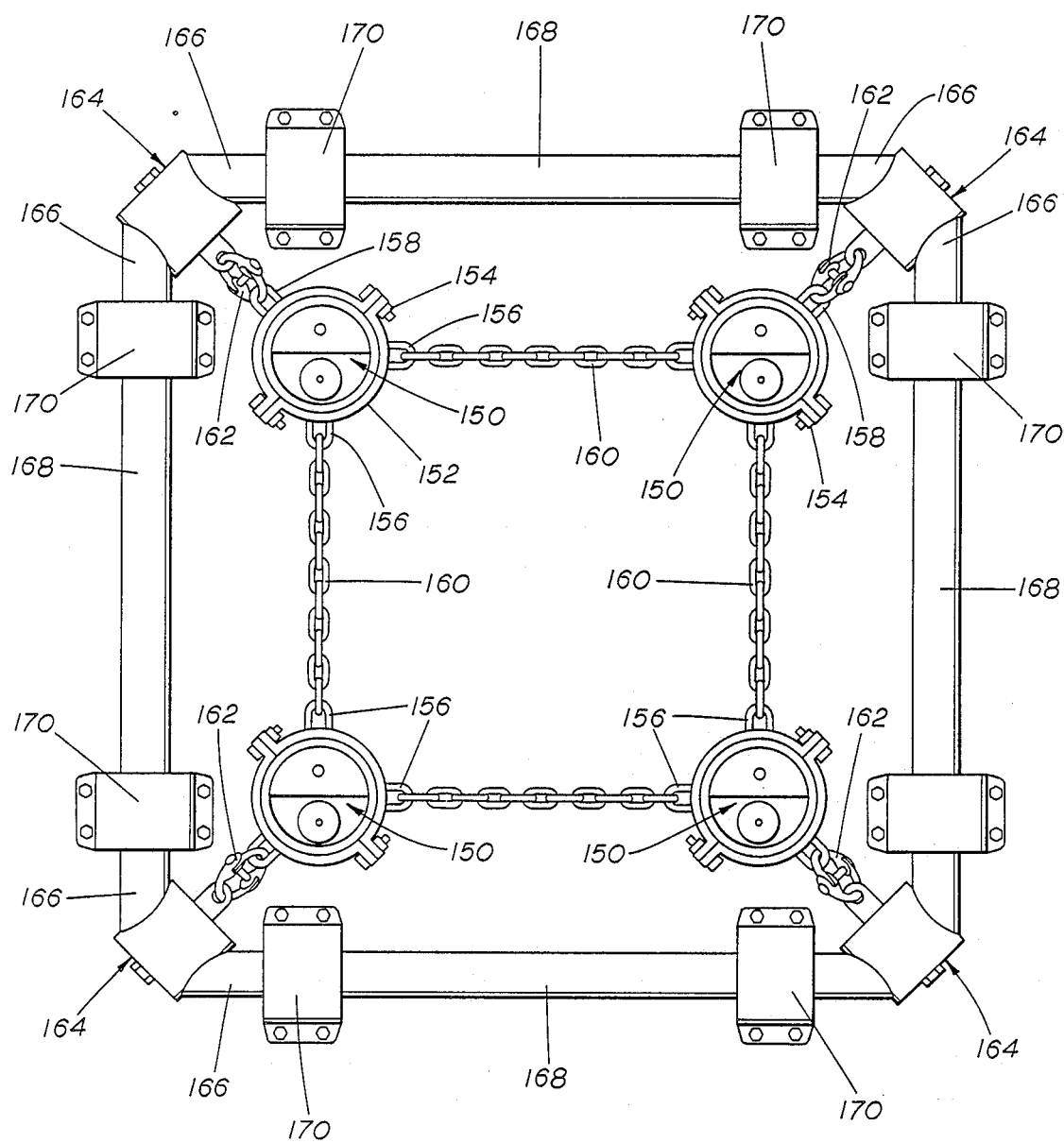
FIG. 7 is a plan end view of another embodiment of a marine seismic source array embodying the present invention. The frame includes four air gun assemblies held at a selected spacing with respect to each other by a frame in accordance with the invention.

With reference now to FIG. 7, another embodiment of the frame of the present invention will be described. Referring to FIG. 7, it can be seen that air gun assemblies 150, similar to those previously described, are held fixedly in clamp assemblies 152. Clamp assemblies 152 each comprise two semicylindrical halves secured together by longitudinal bolts 154. Clamps such as those are commercially available from Geophysical Service, Inc., Dallas, Texas may be suitably modified to make clamp assemblies similar to those shown in FIG. 7. Eyes 156 and 158 are welded to the exterior of the semi-cylindrical halves. Each of the two eyes 156 on each clamp assembly 152 are connected to another eye 156 on another clamp assembly 152 by a chain leg 160. In the embodiment illustrated, chain legs 160 are of equal length. Eye 158 on each clamp assembly 152 is in turn connected by a detachable link 162 to shock spring assembly 164. Shock spring assembly 164 will be described in greater detail below with respect to FIG. 8. Each shock spring assembly 164 is preferably mounted to a corner member which describes a predetermined angle. In the embodiment of the invention illustrated, which is intended to mount four air gun assemblies in a square pattern, shock spring assembly 164 has two pipe links 166 welded to it at a right angle to each other to form a corner member. Clamp assemblies 152 are connected to shock spring assemblies 164 interior to the angle described by the corner member. Pipe links 166 are connected to spool assemblies 168 by shock absorber assemblies 170, as described above with respect to FIGS. 5 and 6. When assembled as shown, shock spring assemblies provide tension which, in conjunction with chain legs 160, act to position clamp assemblies 152 and gun assemblies 150 at the corners of a square pattern at a desired separation distance from each other.

Figure 8:
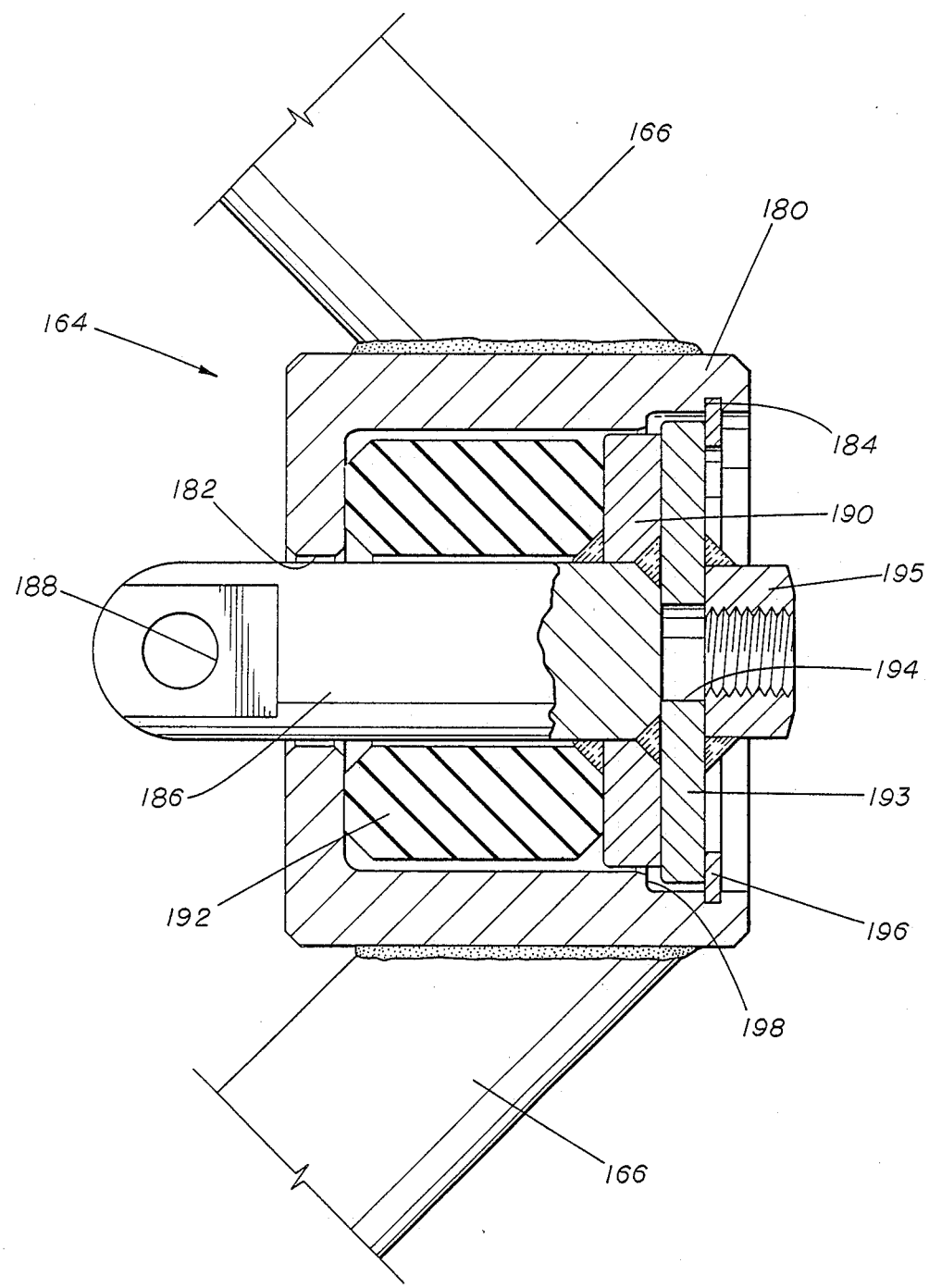
FIG. 8 is a sectional view of a spring-shock assembly as used in the frame of the present invention and shown in FIG. 7.

With reference now to FIG. 8, the shock spring assembly shown in FIG. 7 will be described in greater detail. Shock spring assembly 164 comprises a housing 180 which is preferably cylindrical or cup-shaped, having a substantially closed end penetrated by a bore 182 passing therethrough, and a substantially open end, or mouth, having a circumferential groove 184 about the interior thereof. Shank 186 extends longitudinally through housing 180 and bore 182, and protrudes beyond the closed end of housing 180. The protruding end of shank 186 is pierced by eye 188, which provides an attachment point for a detachable link or other connector, as shown in FIG. 7. The other end of shank 186 preferably terminates proximate the open end of housing 180, and has circular compression ring or end plate 190 welded thereto. End plate 190 extends radially about shank 186, and has an external diameter which permits its longitudinal travel within housing 180. Positioned intermediate compression end plate 190 and the closed end of housing 180 is elastomeric block 192. Elastomeric block 192 is preferably toroidal (doughnut-shaped), and may be made of any suitable elastomeric material, such as synthetic rubber for example. When shock spring assembly 164 is assembled in the frame of the present invention as shown in FIG. 7, elastomeric block 192 is preferably slightly compressed and provides tension against the chain legs to position the gun assemblies. This tension also helps absorb slack in the chain legs caused by wear. Furthermore, elastomeric block 192 provides shock absorbing capacity to absorb the explosive shock energy generated when the air guns are fired.

In order to assist in the assembly of the frame as shown in FIG. 7, shock spring assembly 164 may preferably be fitted with an end cap 193 having a central bore 194 therethrough and a threaded nut 195 welded thereto so as to be substantially coaxial with central bore 194. End cap 193 is secured within the mouth of housing 180 by snap ring 196 which is retained in circumferential groove 184. An internal shoulder 198 is also preferably provided in order to limit the travel of end cap 193 into the interior of housing 164 and thus prevent it from becoming askew therein when the assembly is compressed under tension against the chain legs. Threaded nut 195 permits a bolt (not shown) to be threaded therethrough and through bore 194 in end cap 193 so that it abuts the terminal end of shank 186. The bolt can then be tightened so as to compress elastomeric block 192 and displace shank 186 longitudinally within housing 180. With shank 186 thus displaced, the gun assemblies can readily be connected to the shank, by means of a detachable link or other connector, without need for assembly personnel to struggle to manually overcome the tension exerted by the shock spring assembly.

The present invention provides an advantageous means of maintaining a critical gun to gun spacing in an interdependent air gun array. The gun-to-gun spacing can be readily adjusted for various gun sizes by selecting and installing spool assemblies of suitable lengths. The invention also provides convenient and effective clamp assemblies for attaching and supporting air guns and holding them in their correct positions. Still further, the present invention provides shock absorbing means to facilitate long air gun and frame life.

Various modifications and alterations in the apparatus of this invention will be apparent to those skilled in the art without departing from the scope and spirit of this invention. Although the invention has been described in connection with specific preferred embodiments, it should be understood that the invention as claimed should not be unduly limited to such specific embodiments.

I claim:

1. An apparatus for positioning a plurality of marine seismic sources in an array, said apparatus comprising:
   a frame;
   a plurality of retaining means, each said retaining means being adapted to be fixed to at least one said marine seismic source, each said retaining means further being mounted to said frame so that each said seismic source retained therein is spaced apart from the nearest other said seismic source in said array by a predetermined critical distance;
   a plurality of rigid members connected to the frame and to the retaining means and having sufficient rigidity to prevent substantial movement of the marine seismic sources when such sources are fired, thereby creating in such rigid members severe tensional and compressional shock loadings; and
   shock absorbing means mounted in said frame intermediate each said retaining means and each other said retaining means mounted to said frame so as to absorb the severe explosive or implosive tensional and compressive shock loadings in the rigid members between said retaining means.

2. The apparatus of claim 1, wherein said marine seismic sources are compressed gas gun assemblies.

3. The apparatus of claim 2, wherein each said retaining means comprises a clamp assembly adapted to be clamped about one said compressed gas gun assembly.

4. The apparatus of claim 3, wherein the rigid members are elongate spacing members and wherein each said clamp assembly is detachably mounted on a first end of a first elongate spacing member which has another said clamp assembly detachably mounted on the other end thereof, so that the distance by which said clamp assemblies are spaced apart can be varied by removing said first elongate spacing member and substituting therefor a second elongate spacing member having a length different from the length of said first elongate spacing member.

5. The apparatus of claim 4, wherein said shock absorbing means comprises at least one resilient shock absorber mounted intermediate each said elongate spacing member and each said clamp assembly mounted on the ends thereof.

6. The apparatus of claim 5, wherein each said resilient shock absorber comprises an elastomeric stack shock absorber.

7. The apparatus of claim 3, wherein said elongate spacing members are arranged in a polygonal form so that each said clamp assembly is positioned at a corner of said polygonal form and has at least two said elongate spacing members attached thereto.

8. The apparatus of claim 7, wherein said polygonal form is a square.

9. The apparatus of claim 7, wherein each said compressed gas gun assembly in said array is capable of producing in a body of water a gas bubble having a radius, R, and said predetermined critical distance is no less than 1.2 R.

10. The apparatus of claim 9, wherein each said compressed gas gun in said array is separated from the farthest other said compressed gas gun in said array by a distance no greater than 2R.

11. An apparatus for positioning a plurality of marine seismic sources in an array, said apparatus comprising:
a plurality of retaining means, each said retaining means being adapted to retain one said marine seismic source;
a plurality of elongate spacing members having sufficient rigidity to prevent substantial movement of the marine seismic sources when the sources are fired thus creating severe tensional and compressive shock loadings on the elongate spacing members, at least one said spacing member being mounted to each said retaining means so that each said seismic source retained therein is spaced apart form the other said seismic sources in said array by a distance no less than a first predetermined distance and no greater than a second predetermined distance, and
shock absorbing means mounted intermediate each said retaining means and each said elongate spacing member mounted thereto for absorbing the severe tensional and compressional shock loadings imposed on the elongate spacing members by the explosive or implosive shock energy resulting from firing the marine seismic sources.

12. The apparatus of claim 11, wherein said marine seismic sources are air gun assemblies.

13. The apparatus of claim 12, wherein said each said retaining means is a clamp assembly which is adapted to clamp about a said air gun assembly.

14. The apparatus of claim 13, wherein each said elongate spacing member is a pipe link.

15. The apparatus of claim 14, wherein each said shock absorbing means is a resilient shock absorber.

16. The apparatus of claim 15, wherein each said resilient shock absorber is an elastomeric stack shock absorber.

17. The apparatus of claim 15, wherein said pipe links are arranged in a polygonal form so that each said clamp assembly is positioned at a corner of said polygonal form and has at least two said pipe links mounted thereto.

18. The apparatus of claim 17, wherein each said air gun assembly in said array is capable of producing in a body of water an air bubble having a radius, R, and said first predetermined distance is 1.2 R and said second predetermined distance is 2R.

19. The apparatus of claim 18, wherein said polygonal form is a square.

20. An apparatus for positioning a plurality of marine seismic compressed gas gun assembles in an array, said apparatus comprising:
a plurality of clamp assemblies, each said clamp assembly being adapted to clamp about one said compressed gas gun assembly, each said clamp assembly further having two mounting means attached thereto;
a plurality of pipe links, each said pipe link having mounting means attached to the ends thereof, each said pipe link further having two said clamp assemblies detachably mounted thereto by said mounting means on said pipe link and said mounting means on said clamp assemblies, so that each said clamp assembly attached to a said pipe link is spaced apart from the other said clamp assembly attached thereto by a predetermined distance; and
a plurality of elastomeric stack shock absorbers, each said stack shock absorber being positioned about said mounting means on said pipe links and said mounting means on said clamp assemblies attached to said pipe links so as to absorb explosive shock energy generated by the firing of said compressed gas gun assemblies clamped in said clamp assemblies.

21. The apparatus of claim 20, wherein said marine seismic compressed gas gun assemblies are air gun assemblies.

22. The apparatus of claim 21, wherein said air gun assemblies are substantially cylindrical in shape.

23. The apparatus of claim 22, wherein each said clamp assembly further comprises a pair of semi-cylindrical portions adapted to grasp the exterior of one said air gun assembly.

24. The apparatus of claim 23, wherein said semicylindrical portions are pivotably mounted with respect to each other.

25. The apparatus of claim 24, wherein each said air gun assembly is provided with first and second mounting portions arranged along its length, each said mounting portion being adapted to be grasped by a said clamp assembly.

26. The apparatus of claim 25, further comprising elastomeric sleeves about each said mounting portion on said air gun assemblies.

27. The apparatus of claim 25 wherein each said first mounting portion on each said air gun assembly is grasped in a first said clamp assembly, and each said second air gun assembly is grasped in a second said clamp assembly.

28. The apparatus of claim 27, wherein each said first clamp assembly is connected to another said first clamp assembly by a said pipe link, and each said second clamp assembly is connected to another said second clamp assembly by a said pipe link.

29. The apparatus of claim 28, wherein said pipe links interconnecting said first clamp assemblies are arranged in a first polygonal form so that each said first clamp assembly is positioned at a corner of said first polygonal form, and said pipe links interconnecting said second clamp assemblies are arranged in a second polygonal form so that each said second clamp assembly is positioned at a corner of said second polygonal form.

30. The apparatus of claim 29, wherein each said polygonal form is substantially parallel to each other said polygonal form.

31. The apparatus of claim 30, wherein each said polygonal form is a square.

32. The apparatus of claim 29, wherein said mounting means on said clamp assemblies are flanges, and said mounting means on said pipe links are flanges.

33. The apparatus of claim 32, wherein each said elastomeric stack shock absorber comprises:
at least one elastomeric element positioned so as to absorb shock energy in the push direction between said flanges on said clamp assemblies and said flanges on said pipe links, and
at least one elastomeric element positioned so as to absorb shock energy in the pull direction between said flanges on said clamp assemblies and said flanges on said pipe links.

34. The apparatus of claim 32, wherein each said elastomeric stack shock absorber comprises:
- an elastomeric disc positioned between said flange on said clamp assembly and said flange on said pipe link;
- an elastomeric toroid positioned about said pipe link and adjacent to the side of said flange on said pipe link which is opposite said elastomeric disc;
- a compression ring positioned about said pipe link and adjacent to the side of said elastomeric toroid element which is opposite said flange on said pipe link; and
- a plurality of bolts, each said bolt passing through said compression ring, said elastomeric toroid, said flange on said pipe link, said elastomeric disc, and said flange on said clamp assembly, so as to hold said flanges and said elastomeric stack shock absorber together.

35. The apparatus of claim 32, wherein each said flange attached to a said clamp assembly is mounted to a pipe extension on said clamp assembly, and each said elastomeric stack shock absorber comprises:
- an elastomeric disc positioned between said flange on said clamp assembly and said flange on said pipe link;
- a first elastomeric toroid positioned about said pipe extension and adjacent to the side of said flange on said clamp assembly which is opposite said elastomeric disc;
- a second elastomeric toroid positioned about said pipe link and adjacent to the side of said flange on said pipe link which is opposite said elastomeric disc;
- a pair of semi-cylindrical shock covers, each said shock cover having a pair of longitudinally spaced-apart semi-circular compression plates mounted about the interior thereof; and
- means for securing said semi-cylindrical shock covers together, so that said elastomeric disc is held between said flanges, said first and second elastomeric toroids are held adjacent said sides of said flanges opposite said elastomeric disc, and said end plates are held adjacent the sides of said elastomeric toroids which are opposite said flanges.

36. An apparatus for positioning a plurality of marine seismic sources in an array, said apparatus comprising:
- a plurality of corner pipe links, each said corner pipe link describing a predetermined angle;
- a plurality of clamp assemblies, each said clamp assembly being adapted to retain a said marine seismic source therein, each said clamp assembly further being mounted to a said corner pipe link interior to the angle described thereby;
- a plurality of substantially linear pipe links, each said linear pipe link having a first said corner pipe link and a second said corner pipe link attached to the ends thereof, so that each said seismic source in said array is spaced apart from each other said seismic source in said array by a distance which is no less than a first predetermined distance and no greater than a second predetermined distance; and
- shock absorbing means mounted intermediate each said linear pipe link and each said corner pipe link attached thereto.

37. The apparatus of claim 36, wherein each said corner pipe link is an arcuate pipe link having a first end and a second end.

38. The apparatus of claim 37, wherein each said arcuate pipe link has a first said linear pipe link attached to said first end thereof, and a second linear pipe link attached to said second end thereof.

39. The apparatus of claim 38, wherein said angle described by each said arcuate pipe link is 90°, and said arcuate pipe links are attached to said linear pipe links so as to form a substantially square pattern with said clamp assemblies positioned interior to the corners thereof.

40. The apparatus of claim 38, wherein each said shock absorbing means is an elastomeric stack shock absorber.

41. An apparatus for positioning a plurality of marine seismic sources in an array, said apparatus comprising:
- a plurality of clamp assemblies, each said clamp assembly being adapted to retain one said marine seismic source therein;
- at least one chain leg connecting each said clamp assembly to at least one other said clamp assembly;
- means attached to each said clamp assembly for resiliently tensioning said clamp assemblies outwardly against said chain leg;
- a plurality of corner members, each said corner member describing a predetermined angle and having a said resilient tensioning means attached thereto interior to said angle;
- a plurality of elongate spacing members, each said elongate spacing member having a first said corner member and a second said corner member attached to the ends thereof; and
- shock absorbing means mounted intermediate each said elongate spacing member and each said corner member attached thereto.

42. The apparatus of claim 41, wherein each said resilient tensioning means is an elastomeric spring shock absorber.

43. The apparatus of claim 42, wherein said elastomeric spring shock absorber comprises:
- a substantially cylindrical housing having a substantially closed end with a bore therethrough and a substantially open end;
- an elongate shank disposed coaxially in said housing and having a first end which extends outwardly through said bore and which is adapted to be connected to a said clamp assembly, and a second end which extends proximate said substantially open end of said housing;
- a compression ring secured to and extending axially about said elongate shank proximate said substantially open end of said housing; and
- a toroidal elastomeric block positioned about said shank and within said housing intermediate said substantially closed end thereof and said compression ring.

44. The apparatus of claim 43, wherein each said corner member comprises a pair of pipe links welded to said cylindrical housing at said predetermined angle to each other.

45. The apparatus of claim 43, wherein said second end of said elongate shank terminates proximate said open end of said cylindrical housing, and said elastomeric spring shock absorber further comprises:
- an end cap mounted on said open end of said cylindrical housing, said end cap having a threaded bore therethrough which is substantially coaxial with said elongate shank, so as to permit a bolt to be threaded through said end cap and against said terminal end of said elongate shank, in order to displace said shank longitudinally into said housing and thereby compress said toroidal elastomeric block.

46. The apparatus of claim 45, wherein said elongate shank is connected to said clamp by a detachable link.

47. The apparatus of claim 44, wherein each said shock absorbing means is an elastomeric stack shock absorber.

48. The apparatus of claim 44, wherein each said elongate spacing member is a substantially linear pipe link.

49. The apparatus of claim 48, wherein said predetermined angle described by each said corner member is 90°, and said corner members are attached to said linear pipe links so as to form a substantially square pattern.

50. A marine seismic source array, said array comprising:
a plurality of marine seismic sources;
a plurality of retaining means, each said retaining means having a said marine seismic source fixed therein;
a frame, said frame comprising a plurality of rigid members for connecting each said retaining means thereto so that each said seismic source retained therein is spaced apart from each other said marine seismic source in said array by a distance no less than a first predetermined distance and no greater than a second predetermined distance, said rigid members having sufficient rigidity to prevent substantial movement of the marine seismic sources when such sources are fired, thereby creating in such rigid members severe tensional and compressive shock loadings; and
shock absorbing means mounted in said frame intermediate each said retaining means mounted thereto and each other said retaining means mounted thereto for absorbing the severe tensional and compressive shock loadings in the rigid members resulting from explosive or implosive shock energy caused by firing said marine seismic sources.

51. The array of claim 50, wherein said marine seismic sources are air gun assemblies.

52. The array of claim 51, wherein each said retaining means is a clamp assembly which is clamped about a portion of said air gun assembly retained therein.

53. The array of claim 52, wherein each said air gun assembly is provided with an elastomeric sleeve about said portion of said air gun assembly about which said clamp assembly is clamped.

54. The array of claim 4, wherein each said shock absorbing means is an elastomeric stack shock absorber.

55. The array of claim 54, wherein said rigid members are substantially linear pipe links.

56. The array of claim 55, wherein said pipe links are arranged in a polygonal form so that each said clamp assembly attached thereto is positioned at a corner of said polygonal form, and has at least two said pipe links attached thereto.

57. The array of claim 56, wherein each said air gun assembly is capable of producing in a body of water an air bubble having a radius, R, and said first predetermined distance is 1.2 R and said second predetermined distance is 2R.

58. The array of claim 57, wherein said polygonal form is a square.

* * * * *